US012613450B2

(12) United States Patent
Seo

(10) Patent No.: US 12,613,450 B2
(45) Date of Patent: Apr. 28, 2026

(54) CAMERA MODULE

(71) Applicant: LG INNOTEK CO., LTD., Seoul (KR)

(72) Inventor: Eun Sung Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 296 days.

(21) Appl. No.: 18/259,652

(22) PCT Filed: Dec. 28, 2021

(86) PCT No.: PCT/KR2021/020083
§ 371 (c)(1),
(2) Date: Jun. 28, 2023

(87) PCT Pub. No.: WO2022/145992
PCT Pub. Date: Jul. 7, 2022

(65) Prior Publication Data
US 2024/0069409 A1 Feb. 29, 2024

(30) Foreign Application Priority Data
Dec. 29, 2020 (KR) ........................ 10-2020-0186360

(51) Int. Cl.
G03B 5/00 (2021.01)

(52) U.S. Cl.
CPC ........ G03B 5/00 (2013.01); G03B 2205/0023 (2013.01)

(58) Field of Classification Search
CPC ........................... G03B 5/00; G03B 2205/0023
(Continued)

(56) References Cited

U.S. PATENT DOCUMENTS

| | | | |
|---|---|---|---|
| 2008/0129831 A1* | 6/2008 | Cho ......................... | G03B 5/00 |
| | | | 348/344 |
| 2009/0237792 A1* | 9/2009 | Owashi ................. | G02B 7/102 |
| | | | 348/208.7 |

(Continued)

FOREIGN PATENT DOCUMENTS

| | | |
|---|---|---|
| JP | 2007-228006 A | 9/2007 |
| KR | 10-2008-0050880 A | 6/2008 |

(Continued)

OTHER PUBLICATIONS

International Search Report dated May 2, 2022 in International Application No. PCT/KR2021/020083.

*Primary Examiner* — Sharrief I Broome
(74) *Attorney, Agent, or Firm* — Saliwanchik, Lloyd & Eisenschenk

(57) ABSTRACT

A camera module comprises a first optical path control member disposed on a moving path of light reflected from a subject and reflects the light incident in a first direction in a second direction perpendicular to the first direction, a first driving member connected to the first optical path control member and controlling a movement of the first optical path control member, a lens portion disposed on the moving path of the light and including at least one lens, an image sensor that detects light passing through the lens, a sensing portion that detects angular velocity and acceleration changing by shaking, and a control portion for controlling the tilt of the first optical path control member in a first or second axis based on the angular velocity and acceleration changing by the shaking.

20 Claims, 4 Drawing Sheets

(58) Field of Classification Search
USPC ......................................................... 359/555
See application file for complete search history.

(56)                          References Cited

U.S. PATENT DOCUMENTS

2013/0163972  A1 *    6/2013   Miyazawa  ............... G03B 5/00
                                                                      396/55
2019/0004328  A1 *    1/2019   Lee  .................... G02B 13/0065

FOREIGN PATENT DOCUMENTS

KR          10-1711807  B1     3/2017
KR       10-2017-0105236  A     9/2017
KR       10-2019-0004121          1/2019
KR       10-2019-0072690          6/2019
KR       10-2019-0137036  A     12/2019

* cited by examiner

1000

| | |
|---|---|
| Lens portion | —100 |
| Image sensor | —300 |
| First optical path control member | —400 |
| First driving member | —500 |
| Sensing portion | —700 |

CAMERA MODULE

CROSS-REFERENCE TO RELATED APPLICATIONS

This application is the U.S. national stage application of International Patent Application No. PCT/KR2021/020083, filed Dec. 28, 2021, which claims the benefit under 35 U.S.C. § 119 of Korean Application No. 10-2020-0186360, filed Dec. 29, 2020, the disclosures of each of which are incorporated herein by reference in their entirety.

TECHNICAL FIELD

An embodiment relates to a camera module having improved performance.

BACKGROUND ART

The camera module performs a function of photographing an object and storing it as an image or video and is installed in various applications. In particular, the camera module is manufactured in a small size and is applied to portable devices such as smartphones, tablet PCs, and laptops, as well as drones and vehicles, providing various functions. For example, the optical system of the camera module may include an imaging lens that forms an image and an image sensor that converts the formed image into an electrical signal. At this time, the camera module may perform an autofocus (AF) function of aligning the focal length of the lens by automatically adjusting the distance between the image sensor and the imaging lens, and a distant object through a zoom lens It is possible to perform a zooming function of zooming up or zooming out by increasing or decreasing the magnification of. In addition, the camera module employs an image stabilization (IS) technology to correct or inhibit image stabilization due to camera movement caused by an unstable fixing device or a user's movement.

Such image stabilization (IS) technology includes an optical image stabilization (OIS) technology and an image stabilization technology using an image sensor. Here, the OIS technology is a technology that corrects motion by changing the path of light, and the image stabilization technology using the image sensor is a technology that corrects motion in a mechanical and electronic way. Here, the OIS technology includes a reflective member that may change the path of light, a driving member, and the camera module may control the position of the reflective member with the driving force of the driving member to the path of light. For example, the camera module may include a sensor that detects a change in angular velocity due to shaking, and may control the position of the reflective member based on the amount of change in angular velocity detected by the sensor. However, although the camera module performs shake correction based on a change in angular velocity when shake occurs, shake correction is not performed according to a position change of the camera module. For this reason, there is a problem in that it is difficult for the shake correction function to operate effectively when the subject is located at a near distance. Accordingly, a new camera module capable of solving the above problems is required.

DISCLOSURE

Technical Problem

An embodiment provides a camera module with improved optical characteristics. An embodiment provides a camera module capable of effectively compensating for image shake that occurs when photographing a subject located at various distances. An embodiment provides a camera module having a slim and compact structure. An embodiment provides a camera module applicable to a folded camera having a thin thickness.

Technical Solution

A camera module according to an embodiment may comprise a first optical path control member disposed on a moving path of light reflected from a subject and reflects the light incident in a first direction in a second direction perpendicular to the first direction, a first driving member connected to the first optical path control member and controlling a movement of the first optical path control member, a lens portion disposed on the moving path of the light and including at least one lens, an image sensor that detects light passing through the lens, a sensing portion that detects angular velocity and acceleration changing by shaking, and a control portion for controlling the tilt the first optical path control member in a first or second axis based on the angular velocity and acceleration changing by the shaking. The camera module may include a third direction perpendicular to the first and second directions, and the first optical path control member may be provided to be tilt able in each of the second and third directions with a rotation axis.

In addition, the tilt angle of the first optical path control member may satisfy the following Equation 1:

$$\frac{\varphi x}{2} - \frac{\tan^{-1}\left(\frac{Ty}{L}\right)}{2} - 1 < \theta x < \frac{\varphi x}{2} - \frac{\tan^{-1}\left(\frac{Ty}{L}\right)}{2} + 1 \qquad \text{[Equation 1]}$$

$$\frac{\varphi y}{2} - \frac{\tan^{-1}\left(\frac{Tx}{L}\right)}{2} - 1 < \theta y < \frac{\varphi y}{2} - \frac{\tan^{-1}\left(\frac{Tx}{L}\right)}{2} + 1$$

(In Equation 1, L means a distance to the subject, θx means an angle at which the first optical path control member tilts in the second direction as an axis, and θy means an angle at which the first optical path control member tilts in the third direction as an axis. In addition, Φx means an amount of angle change of the camera module with respect to the second direction obtained by the control portion, and Φy means an amount of angle change of the camera module with respect to the third direction obtained by the control portion. Also, Tx means an amount of change in the position of the camera module in the second direction obtained by the control portion, and Ty means an amount of change in the position of the camera module in the third direction obtained by the control portion.).

According to an embodiment of the invention, an optical axis of the lens portion may be perpendicular to an upper surface of the image sensor. The sensing portion may include a first sensing portion for detecting a change in angular velocity of the camera module and a second sensing portion for detecting a change in acceleration of the camera module.

A camera module according to an embodiment may comprise a first optical path control member disposed on a moving path of light reflected from a subject and reflects the light incident in a first direction in a second direction perpendicular to the first direction, a first driving member connected to the first optical path control member and controlling a movement of the first optical path control member, a lens portion disposed on the moving path of the light and including at least one lens, an image sensor that detects light passing through the lens, a sensing portion that detects angular velocity and acceleration changing by shaking, a second driving member connected to the image sensor and controlling the position of the image sensor, and a control portion controlling a tilt angle of the first light path control member and a position of the image sensor based on the angular velocity and acceleration changed by the shaking.

According to an embodiment of the invention, the camera module comprises a third direction perpendicular to the first and second directions, and the first light path control member may be provided to be tiltable in each of the second and third directions as a rotational axis. The tilt angle of the first optical path control member may satisfy the following Equation 2:

$$\frac{\phi x}{2} - 1 < \theta x < \frac{\phi x}{2} + 1 \qquad \text{[Equation 2]}$$

$$\frac{\phi y}{2} - 1 < \theta y < \frac{\phi y}{2} + 1$$

(In Equation 2, $\theta x$ means an angle at which the first optical path control member tilts in the second direction, and $\theta y$ means an angle at which the first optical path control member tilts in the third direction. In addition, $\Phi x$ means an amount of angle change of the camera module with respect to the second direction obtained by the control portion, and $\Phi y$ means an amount of angle change of the camera module with respect to the third direction obtained by the control portion.).

According to an embodiment of the invention, a moving distance of the image sensor may satisfy the following Equation 3:

$$\frac{Tx \times FL}{L} - 0.5 < Sz < \frac{Tx \times FL}{L} + 0.5 \qquad \text{[Equation 3]}$$

$$\frac{Ty \times FL}{L} - 0.5 < Sy < \frac{Ty \times FL}{L} + 0.5$$

(In Equation 3, L means a distance to the subject, and FL means a total focal length of the lens portion. In addition, Tx means an amount of change in the position of the camera module in the second direction obtained by the control portion, and Ty means an amount of change in the position of the camera module in the third direction obtained by the control portion. In addition to, Sz means a distance that the image sensor moves in the first direction, and Sy means a distance that the image sensor moves in the third direction.).

According to an embodiment of the invention, a height of the second driving member in the first direction may be lower than a height of the first optical path control member in the first direction. An optical axis of the lens portion may be perpendicular to an upper surface of the image sensor.

According to an embodiment of the invention, a second optical path control member disposed between the lens portion and the image sensor is further included, wherein the second optical path control member may reflect light incident in the second direction to the first direction.

According to an embodiment of the invention, a moving distance of the image sensor may satisfy the following Equation 4:

$$\frac{Tx \times FL}{L} - 0.5 < Sx < \frac{Tx \times FL}{L} + 0.5 \qquad \text{[Equation 4]}$$

$$\frac{Ty \times FL}{L} - 0.5 < Sy < \frac{Ty \times FL}{L} + 0.5$$

(In Equation 4, L means the distance to the subject, and FL means a total focal length of the lens portion. In addition, Tx means an amount of change in the position of the camera module with respect to the second direction obtained by the control portion, Ty means an amount of change in the position of the camera module in the third direction obtained by the control portion. Also, Sx means a distance that the image sensor moves in the second direction, and Sy means a distance that the image sensor moves in the third direction.).

According to an embodiment of the invention, a height of the second optical path control member in the first direction may be lower than a height of the first optical path control member in the first direction. An optical axis of the lens portion may be parallel to an upper surface of the image sensor.

Advantageous Effects

The camera module according to the embodiment has improved optical characteristics and may effectively compensate for image shaking. In detail, the camera module may control the tilt angle of the first optical path control member based on changes in angular velocity and acceleration due to shaking. Accordingly, the camera module according to the embodiment may effectively compensate for shaking due to rotation and positional change when photographing a subject located at infinity or a near distance.

The camera module according to the embodiment may control the tilt angle of the first light path control portion based on the change in angular velocity due to shaking, and may control the position of the image sensor based on the change in acceleration due to shaking. Accordingly, the camera module according to the embodiment may effectively compensate for shaking due to rotation and positional change when photographing a subject located at infinity or a near distance. A camera module according to an embodiment may include at least one optical path control member. Accordingly, the camera module may be applied to a folded camera that may have a smaller thickness, and a device including the camera module may be manufactured slim.

DESCRIPTION OF DRAWINGS

FIG. 5 is another diagram showing the arrangement of components of a camera module according to an embodiment.

FIG. 6 is another diagram showing the arrangement of components of a camera module according to an embodiment.

BEST MODE

Figures 1, 2:
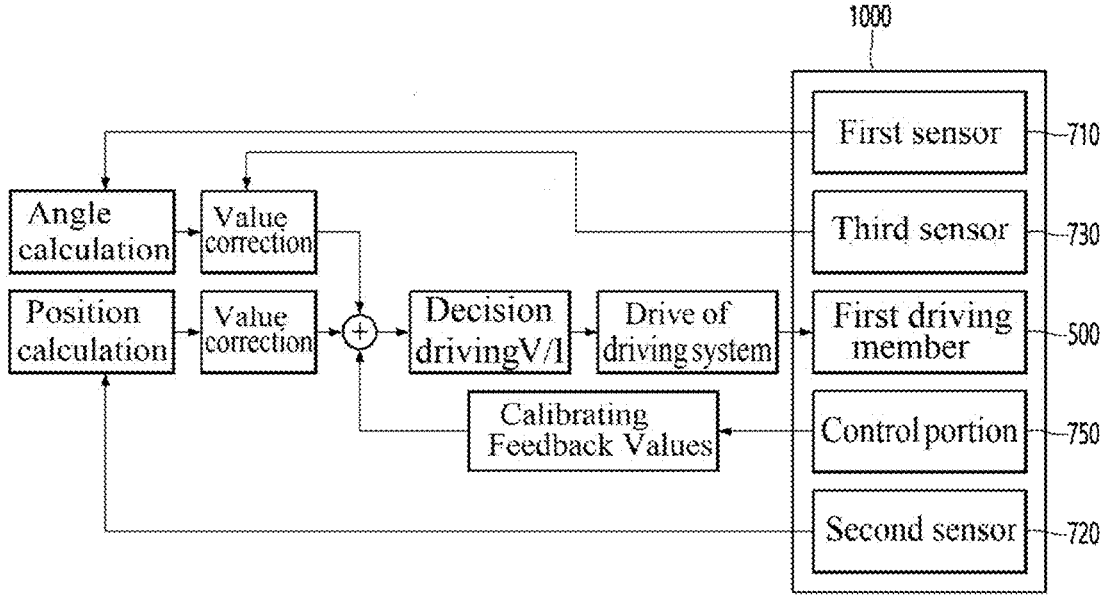
FIG. 1 is a configuration diagram of a camera module according to an embodiment.
FIG. 2 is a diagram for explaining that a camera module according to an embodiment compensates for shaking.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In addition, the convex surface of the lens may mean that the lens surface has a convex shape on the optical axis of the lens, and the concave surface of the lens may mean that the lens surface has a concave shape on the optical axis of the lens. In addition, the "object-side surface" may refer to a surface of the lens facing the object side based on the light moving path, and the "image-side surface" may refer to the surface of the lens facing the image sensor. The object-side surface may be an incident surface through which light is incident, and the upper surface may be a sensor-side surface or an emission surface through which light is emitted.

Figure 3:
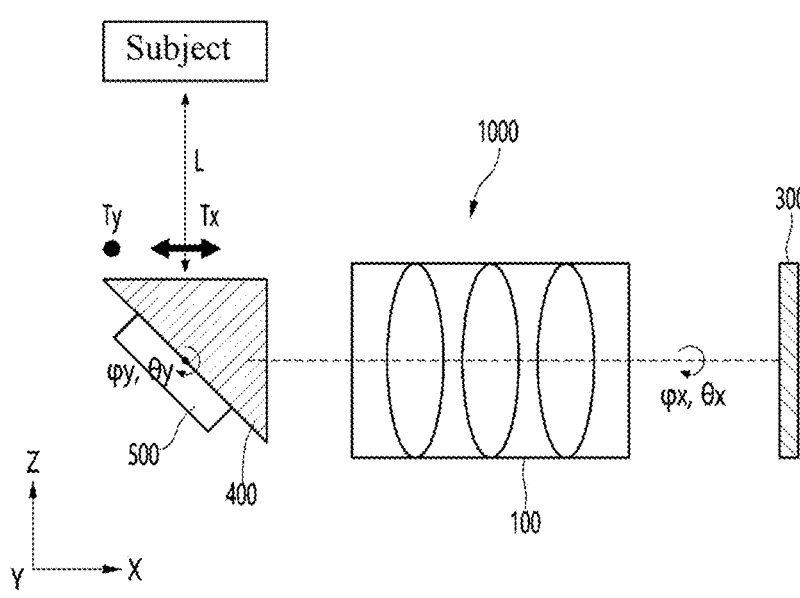
FIGS. 3 and 4 are diagrams showing the arrangement of components of a camera module according to an embodiment.
Figure 4:
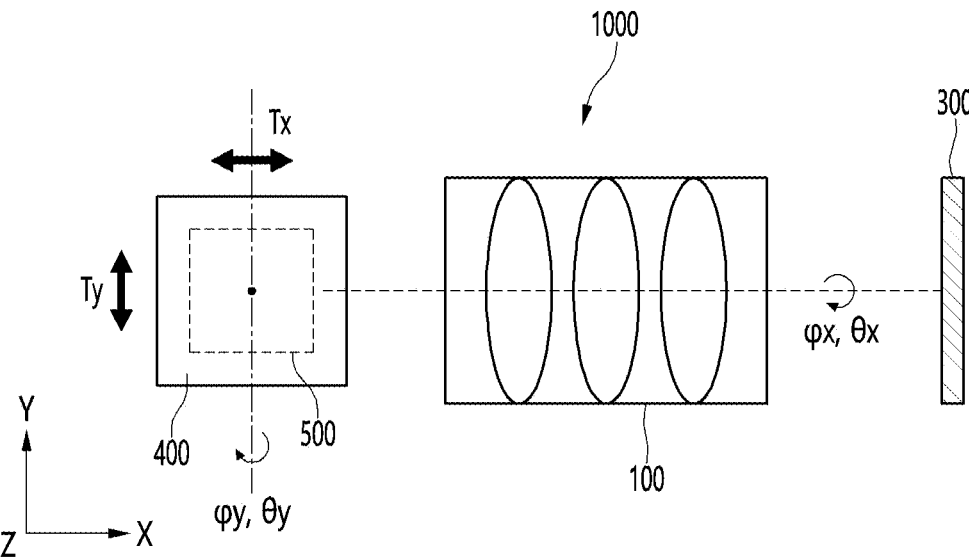

FIG. 1 is a configuration diagram of a camera module according to an embodiment, and FIG. 2 is a diagram for explaining shaking correction of a camera module according to an embodiment. FIGS. 3 and 4 are diagrams showing the arrangement of components of a camera module according to an embodiment.

Referring to FIGS. 1 to 4, the camera module 1000 according to the embodiment may include a lens portion 100, an image sensor 300, a first optical path control member 400, a first driving member 500, and a sensing portion 700. The lens portion 100 may be disposed on a moving path of light reflected from a subject. The lens portion 100 may include a housing and at least one lens. The housing may accommodate the at least one lens. The housing may support the at least one lens. The lens may be provided in a plurality of two or more sheets. The plurality of lenses may include at least one of glass and plastic. The plurality of lenses may be sequentially disposed along the optical axis of the lens portion 100 in a direction from the subject side to the image side. The optical axis of the lens portion 100 may be perpendicular to an upper surface of the image sensor 300. Each of the plurality of lenses may include an effective region and an ineffective region. The effective region may be a region through which light incident to each of the plurality of lenses passes. That is, the effective region may be a region in which the incident light implements optical characteristics. The ineffective region may be arranged around the effective region. The ineffective region may be a region in which the light is not incident. That is, the ineffective region may be a region unrelated to the optical characteristics. Also, the ineffective region may be a region fixed to the housing or the like.

The lens portion 100 may control a path of light reflected from the subject. For example, each of the plurality of lenses may have a positive (+) or negative (−) refractive power, and may have a set shape and thickness. Accordingly, the lens portion 100 may control the path of the light by diffusing, scattering, refraction, or condensing the light reflected from the subject. The lens portion 100 may have a set field of view (FOV). Also, the lens portion 100 may have a set effective focal length (EFL). The effective focal length EFL of the lens portion 100 may be fixed or variably provided within a set range. The image sensor 300 may be disposed on a moving path of light reflected from a subject. For example, the lens portion 100 may be disposed between the subject and the image sensor 300. The image sensor 300 may be disposed on a substrate (not shown).

The substrate may be electrically connected to the image sensor 300 and physically supported. The substrate may be a circuit substrate. The substrate may include a wiring layer for supplying power to the image sensor 300 and may be a printed circuit board (PCB) formed of a plurality of resin layers. As an example, the substrate may include at least one of a rigid PCB, a metal core PCB (MCPCB), a flexible PCB (FPCB), and a rigid flexible PCB (RFPCB).

In addition, the substrate may include a synthetic resin including glass, resin, epoxy, and the like, and may include a ceramic having excellent thermal conductivity and a metal having an insulated surface. The substrate may have a shape such as a plate or a lead frame, but is not limited thereto. In addition, although not shown in the drawing, a Zener diode, a voltage regulator, and a resistor may be further disposed on the substrate, but is not limited thereto. An insulating layer (not shown) or a protective layer (not shown) may be disposed on the substrate. The insulating layer or protective layer may be disposed on at least one of one surface and the other surface of the substrate. The image sensor 300 may be disposed on the substrate. The image sensor may directly contact the upper surface of the substrate and be electrically connected to the substrate. The image sensor 300 may detect light reflected from the subject and incident on the camera module 1000. The image sensor 300 may detect light passing through the lens portion 100. In detail, the image sensor 300 may sense light sequentially passing through the plurality of lenses. The image sensor 300 may include a charge coupled device (CCD) or complementary metal oxide semiconductor (CMOS).

The first optical path control member 400 may be disposed on a moving path of light reflected from the subject. The first optical path control member 400 may be disposed closer to the subject than the lens portion 100. That is, the first optical path control member 400, the lens portion 100, and the image sensor 300 may be disposed in order from the subject side to the image side. The first optical path control member 400 may change the path of light incident from the outside. The first optical path control member 400 may include a reflector and a prism. For example, the first optical path control member 400 may include a right-angle prism. When the first light path control member 400 includes a right-angle prism, the first light path control member 400 may reflect a path of light incident on the camera module 1000 at an angle of 90 degrees. The first light path control member 400 may change the path of the light reflected from the subject to a set direction. For example, the first optical path control member 400 may reflect light incident on the first optical path control member 400 in the first direction (z-axis direction) to change the path of the light to in the second direction (x-axis direction), which is the direction in which the plurality of lenses of the lens portion 100 are disposed.

When the camera module 1000 includes the first light path control member 400, it may be applied to a folded camera capable of reducing the thickness thereof. For example, when the camera module 1000 does not include the first light path control member 400, the plurality of lenses of the lens portion 100 in the device may be disposed to extend in a directed perpendicular to the surface of the device. Accordingly, the camera module 1000 including the plurality of lenses has a high height in a direction perpendicular to the surface of the device, which makes it difficult to form the camera module 1000 and the device including the same thin. However, when the camera module 1000 includes the first light path control member 400, the camera module 1000 may change the light incident in the direction perpendicular to the surface of the applied device in a direction parallel to the surface of the device. That is, the plurality of lenses of the lens portion 100 may be disposed extending in a direction parallel to the surface of the device, and the optical axis of the lens portion 100 may be disposed parallel to the surface of the device. Accordingly, the camera module 1000 including the lens portion 100 may have a low height in the direction perpendicular to the surface of the device, and thus may have a smaller thickness within the device, thereby also making the device thinner.

The first driving member 500 may be connected to the first optical path control member 400. The first driving member 500 may include at least one actuator. For example, the first driving member 500 may include at least one of a voice coil motor (VCM), a piezo-electric device, a shape memory alloy, and a MEMS device as an actuator. The first driving member 500 may move the first light path control member 400 by using the driving force of the actuator. For example, the first driving member 500 may control the tilt of the first light path control member 400 along a first axis or a second axis. In detail, the first driving member 500 may control the tilt of the first optical path control member 400 in the second direction (x-axis direction) as a rotation axis. In addition, the first driving member 500 may control the tilt of the first optical path control member 400 in a third direction (y-axis direction) as a rotation axis. Accordingly, the camera module 1000 may compensate for shaking.

The sensing portion 700 may detect shaking of the camera module 1000. For example, the sensing portion 700 may detect rotation and position change applied to the camera module 1000. The sensing portion 700 may include a first sensing portion 710 and a second sensing portion 720. The first sensing portion 710 may be a sensor that detects a change in angular velocity of the camera module 1000. For example, the first sensing portion 710 may include a gyro sensor. Also, the second sensing portion 720 may be a sensor that detects a change in acceleration of the camera module 1000. For example, the second sensing portion 720 may include an acceleration sensor. The sensing portion 700 may detect angular velocity and acceleration that change due to shaking of the camera module 1000 using the first sensing portion 710 and the second sensing portion 720.

The camera module 1000 may include a filter (not shown). The filter may be disposed between the lens portion 100 and the image sensor 300. In detail, the filter may be disposed between the image sensor 300 and a lens closest to the image sensor 300 among the plurality of lenses of the lens portion 100. The filter may include at least one of an infrared filter and an optical filter such as a cover glass. The filter may pass light of a set wavelength band and filter light of a different wavelength band. When the filter includes an infrared filter, radiant heat emitted from external light may be blocked from being transferred to the image sensor 300. In addition, the filter may transmit visible light and reflect infrared light.

The camera module 1000 may include a control portion 750. The control portion 750 may control a signal applied to the first driving member 500 based on information sensed by the sensing portion 700. The control portion 750 may control the movement of the first optical path control member 400 by controlling voltage, current, etc. applied to the first driving member 500. In detail, when shake occurs in the camera module 1000, the sensing portion 700 may detect information about the shake, and the control portion 750 may correct the shake. For example, referring to FIG. 2, when shaking occurs in the camera module 1000, the first sensing portion 710 may detect a change in angular velocity and the second sensing portion 720 may detect a change in acceleration. The sensing portion 700 may calculate the degree of shaking, for example, the degree of rotation and the degree of positional change of the camera module 1000 based on the change detected by the first sensing portion 710 and the second sensing portion 720.

The control portion 750 may correct a feedback value for the signal detected by the sensing portion 700. Here, the feedback value correction may be correction to remove noise or the like from the angular velocity and acceleration change information sensed by the sensing portion 700. Further, the correction of the feedback value may mean correcting a signal to be applied to the first driving member 500 for controlling the first optical path control member 400 based on acquired information. The control portion 750 may provide the corrected signal to the first driving member 500. The first optical path control member 400 may be tilted in a first axis or a second axis by a signal applied from the control portion 750, and may correct shaking due to rotation and position change of the camera module 1000. Accordingly, the camera module 1000 according to the embodiment may effectively compensate for shaking due to rotation and shaking due to position change when photographing a subject located at infinity or a near distance. Accordingly, the camera module 1000 may have improved optical characteristics.

Hereinafter, a comparison of a conventional camera module and a camera module according to an embodiment will be described.

TABLE 1

| | Distance to subject | Shaking | Movement of pixels |
|---|---|---|---|
| Pitch, Yaw | Infinity | 1 degree | 432 |
| | 25 mm | 1 degree | 432 |
| Change of X-Y | Infinity | 0.5 mm | 0 |
| position | 700 mm | 0.5 mm | 17 |
| | 100 mm | 0.5 mm | 124 |
| | 25 mm | 0.5 mm | 354 |

Table 1 shows the change in position of a pixel according to shaking in the camera module. In detail, Table 1 is an experimental example of measuring the number of pixels moving according to shaking using a camera module with a 20 degree of angle of view (FOV) and a pixel size of about 0.7 μm of the image sensor 300. Referring to Table 1, it may be seen that about 432 pixels are moved when shake due to rotation occurs when photographing a subject located at a near distance (25 mm) or infinity. That is, it may be seen that the number of pixels moving when shake due to rotation is not significantly affected by the distance from the subject. It may be seen that about 0 pixel is moved when a position change occurs in the second direction (x-axis direction) and/or the third direction (y-axis direction) when photographing a subject located at an infinity due to rotation. In addition, it may be seen that about 17 pixels are moved when photographing a subject located at about 700 mm, and about 124 pixels are moved when photographing a subject located at 100 mm. Finally, it may be seen that about 354 pixels are moved when photographing a subject located at a near distance (25 mm). That is, it may be seen that the number of moving pixels gradually increases from infinity to near distance when shaking occurs due to position change.

In a conventional camera module, shake correction is performed based on a changing angular velocity when shaking occurs, and no separate shake correction is performed based on an acceleration change according to a position change. For example, a subject located at a distance may be photographed using a conventional camera module. At this time, the conventional camera module performs shake correction by rotation based on the change in angular velocity. However, when the subject is located at a relatively long distance, as shown in Table 1, there was little or very little positional change due to shaking, and thus correction for positional change was not separately performed.

A subject located at a near distance may be photographed using a conventional camera module. At this time, in the conventional camera module, shake correction due to rotation is performed based on angular velocity change, but correction according to position change is not separately performed. Accordingly, there is a problem in that shaking due to a change in position is not effectively compensated for when photographing a subject located at a medium or near distance. However, the camera module 1000 according to the embodiment may perform shake correction according to rotation and position change when photographing a subject. In detail, the camera module 1000 may compensate for shaking by tilting the first light path control member 400 along the first axis or the second axis, and the tilt angle of the first light path control member 400 may satisfy Equation 1 below.

$$\frac{\phi x}{2} - \frac{\tan^{-1}\left(\frac{Ty}{L}\right)}{2} - 1 < \theta x < \frac{\phi x}{2} - \frac{\tan^{-1}\left(\frac{Ty}{L}\right)}{2} + 1 \qquad \text{[Equation 1]}$$

-continued $$\frac{\phi y}{2} - \frac{\tan^{-1}\left(\frac{Tx}{L}\right)}{2} - 1 < \theta y < \frac{\phi y}{2} - \frac{\tan^{-1}\left(\frac{Tx}{L}\right)}{2} + 1$$

In Equation 1, L means the distance to the subject. θx means an angle at which the first optical path control member 400 tilts in the second direction, and θy means an angle at which the first optical path control member 400 tilts in the third direction. In Equation 1, Φx means the amount of angular change of the camera module 1000 in the second direction obtained by the control portion 750, and Φy means the amount of the angular change of the camera module 1000 in the third direction obtained by the control portion 750. In Equation 1, Tx means the amount of position change of the camera module 1000 in the second direction obtained by the control portion 750, and Ty means the amount of the position change of the camera module 1000 in the third direction obtained by the control portion 750. That is, the camera module 1000 according to the embodiment may set the tilt angle of the first light path control member 400 based on the angular velocity and acceleration change detected through the sensing portion 700. At this time, the control portion 750 may set the tilt angle of the first optical path control member 400 in consideration of rotation and position change due to shaking. Accordingly, when photographing a subject located at infinity or a near distance, the camera module 1000 may effectively compensate for shaking due to rotation and position change.

Figures 5, 6:
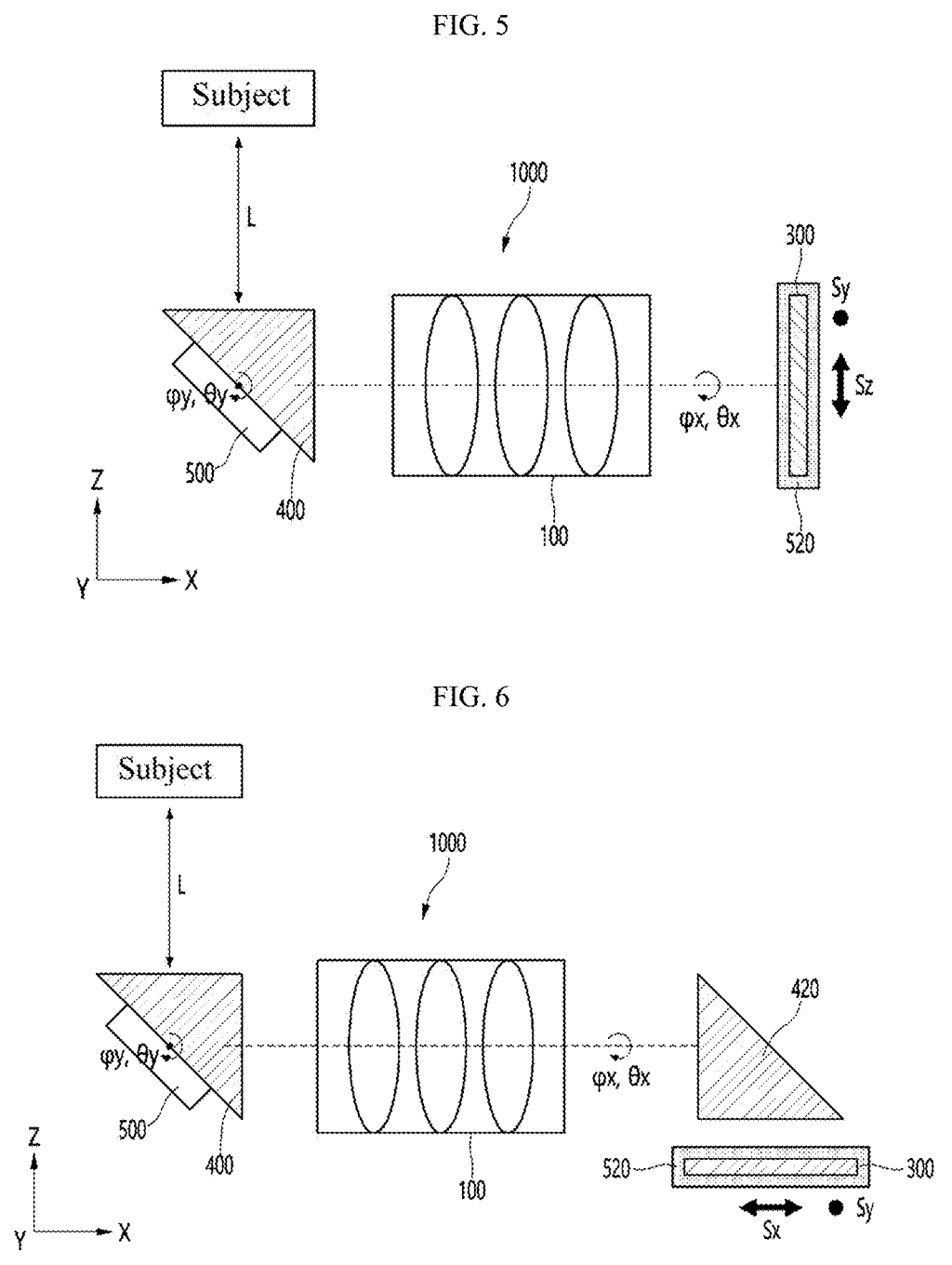

FIG. 5 is another diagram showing the arrangement of components of a camera module according to an embodiment. In the description using FIG. 5, descriptions of identical and similar components to those of the camera module described above are omitted, and identical reference numerals are given to identical and similar components.

Referring to FIG. 5, the camera module 1000 according to the embodiment may include a lens portion 100, an image sensor 300, a first light path control member 400, a first driving member 500, and a second driving member. 520 and a sensing portion 700. The first light path control member 400 may be disposed on a moving path of the light reflected on the subject, and the lens portion 100 may be disposed between the first light path control member 400 and the image sensor 300. An optical axis of the lens portion 100 may be perpendicular to an upper surface of the image sensor 300. That is, the light reflected from the subject may pass through the first light path control member 400 and the lens portion 100 sequentially and be provided to the image sensor 300.

The first driving member 500 may be connected to the first optical path control member 400. The first driving member 500 may include at least one actuator. The first driving member 500 may move the first light path control member 400 by using the driving force of the actuator. For example, the first driving member 500 may control the tilt of the first light path control member 400 along a first axis or a second axis. In detail, the first driving member 500 may control the tilt of the first optical path control member 400 in the second direction (x-axis direction) as a rotation axis. In addition, the first driving member 500 may control the tilt of the first optical path control member 400 in a third direction (y-axis direction) as a rotation axis. Accordingly, the camera module 1000 may compensate for shaking.

The second driving member 520 may be connected to the image sensor 300. The second driving member 520 may include at least one actuator. For example, the second driving member 520 may include at least one of a VCM, a piezo-electric device, a shape memory alloy, and a MEMS device as an actuator. The second driving member 520 may control the position of the image sensor 300 by using the driving force of the actuator. For example, the second driving member 520 may move the image sensor 300 in at least one of a first direction (z-axis direction) and a third direction (y-axis direction). By the driving force of the second driving member 520, the image sensor 300 may correct a position change caused by shaking of the camera module 1000. The second driving member 520 may have a set height. In detail, a height of the second driving member 520 in the first direction (z-axis direction) may be smaller than a height of the first optical path control member 400 in the first direction. Accordingly, it is possible to inhibit the height of the camera module 1000 in the first direction from increasing due to the movement of the second driving member 520 and the image sensor 300, and the camera module may be provided to be slimmer and more compact.

The sensing portion 700 may detect shaking of the camera module 1000. For example, the sensing portion 700 may include a first sensing portion 710 that detects a change in angular velocity and a second sensing portion 720 that detects a change in acceleration, and may detect rotation and positional changes that occur when shaking.

The camera module 1000 may include a control portion 750. The control portion 750 may control signals applied to the first driving member 500 and the second driving member 520, respectively, based on the angular velocity and acceleration change information detected by the sensing portion 700. For example, the control portion 750 may include a first control portion (not shown) and a second control portion (not shown). The first control portion may control the tilt angle of the first light path control portion 400 by controlling voltage, current, etc. applied to the first driving member 500. In addition, the second control portion 750 may control the position of the image sensor 300 by controlling voltage, current, etc. applied to the second driving member 520. In detail, when shake occurs in the camera module 1000, the sensing portion 700 may detect information about the shake, and the control portion 750 may correct the shake. For example, when shaking occurs in the camera module 1000, the first sensing portion 710 may detect a change in angular velocity and the second sensing portion 720 may detect a change in acceleration. The sensing portion 700 may calculate and correct the degree of shaking of the camera module 1000, for example, the degree of rotation and the degree of positional change, based on the change detected by the first sensing portion 710 and the second sensing portion 720.

The control portion 750 may correct a feedback value for the signal detected by the sensing portion 700. Here, the feedback value correction may be correction for controlling noise or the like in the angular velocity and acceleration change information sensed by the sensing portion 700. In addition, the feedback value correction may mean correcting signals to be applied to the first driving member 500 and the second driving member 520 for controlling the first light path control member 400 and the image sensor 500 and image sensor 500 based on the acquired information. In detail, the first control portion may perform correction for the degree of rotation detected by the first sensing portion 710, and the second control portion may perform correction for the degree of position change detected by the second sensing portion 720. Then, the first and second control portions may provide the corrected signals to the first driving member 500 and the second driving member 520, respectively. Accordingly, the first optical path control member 400 is tilted in the first axis or the second axis according to the signal applied from the first control portion, and may correct shaking due to rotation. In detail, the first optical path control member 400 may tilt in the second direction (x-axis direction) and the third direction (y-axis direction) as a rotation axis, and a tilt angle of the first optical path control member 400 may satisfy Equation 2 below.

$$\frac{\phi x}{2} - 1 < \theta x < \frac{\phi x}{2} + 1 \qquad \text{[Equation 2]}$$

$$\frac{\phi y}{2} - 1 < \theta y < \frac{\phi y}{2} + 1$$

In Equation 2, $\theta x$ means an angle at which the first optical path control member 400 tilts in the second direction as an axis, and $\theta y$ means an angle at which the first optical path control member 400 tilts in the third direction as an axis. In Equation 2, $\Phi x$ means an amount of angular change of the camera module 1000 in the second direction obtained by the control portion 750, and $\Phi y$ means an amount of angular change of the camera module 1000 in the third direction obtained by the control portion 750.

In addition, the image sensor 300 may move in at least one of a first direction (z-axis direction) and a third direction (y-axis direction) by a signal applied from the second control portion 750 and may compensate for shaking due to a change in position. In this case, the moving distance of the image sensor 300 may satisfy Equation 3 below.

$$\frac{Tx \times FL}{L} - 0.5 < Sz < \frac{Tx \times FL}{L} + 0.5 \qquad \text{[Equation 3]}$$

$$\frac{Ty \times FL}{L} - 0.5 < Sy < \frac{Ty \times FL}{L} + 0.5$$

In Equation 3, L means a distance to the subject, and FL means a total focal length of the lens portion 100. Tx means the amount of change in the position of the camera module 1000 in the second direction obtained by the control portion 750, and Ty means the amount of change in the position of the camera module 1000 in the third direction obtained by the control portion. In Equation 3, Sz means a distance that the image sensor 300 moves in the first direction (z-axis direction), and Sy means the distance that the image sensor 300 moves in the third direction (y-axis direction). That is, the camera module 1000 according to the embodiment may set the tilt angle of the first light path control member 400 and the image sensor 300 based on the amount of change in angular velocity and acceleration detected through the sensing portion 700. At this time, the control portion 750 may set the tilt angle of the first light path control member 400 through rotation by shaking, and may set the moving distance of the image sensor 300 through a change in position by shaking. Accordingly, it is possible to effectively compensate for shaking due to rotation and positional change when photographing a subject located at infinity or a near distance using the camera module 1000 according to the embodiment.

FIG. 6 is another diagram showing the arrangement of components of a camera module according to an embodiment. In the description using FIG. 6, descriptions of identical and similar components to those of the camera module described above are omitted, and identical reference numerals are assigned to identical and similar components.

Referring to FIG. 6, the camera module 1000 according to the embodiment may include a lens portion 100, an image sensor 300, a first optical path control member 400, a second optical path control member 420, a first driving member 500, a second driving member 520 and a sensing portion 700.

The first light path control member 400 may be disposed on a moving path of the light reflected on the subject, and the lens portion 100 may disposed between the first light path control member 400 and the image sensor 300. The first optical path control member 400 may reflect light incident on the first optical path control member 400 in a first direction (z-axis direction) to change the light path in the second direction (x-axis direction), which is the direction in which plurality of lenses of the lens portion 100 are disposed. The second optical path control member 420 may be disposed between the lens portion 100 and the image sensor 300. The second optical path control member 420 may change the path of light passing through the lens portion 100. The second optical path control member 420 may include a reflector and a prism. For example, the second optical path control member 420 may include a right-angle prism. When the second optical path control member 420 includes a right-angle prism, the second optical path control member 420 may reflect a path of light passing through the lens portion 100 at an angle of 90 degrees.

The second optical path control member 420 may reflect the light passing through the lens portion 100 in the second direction (x-axis direction) to change the light path back to the first direction (x-axis direction) where the image sensor 300 is disposed. An optical axis of the lens portion 100 may be parallel to an upper surface of the image sensor 300. That is, the light reflected from the subject sequentially passes through the first optical path control member 400, the lens portion 100, and the second optical path control member 420 and is provided to the image sensor 300. The second optical path control member 420 may have a set height. In detail, the height of the second optical path control member 420 in the first direction (z-axis direction) may be smaller than the height of the first optical path control member 400 in the first direction. Also, a height of the second optical path control member 420 in the second direction (x-axis direction) may be smaller than a height of the second optical path control member 420 in the first direction. Accordingly, the first direction height of the camera module 1000 may be inhibited from increasing by the second optical path control member 420 and the image sensor 300, and the camera module 1000 may be provided slimmer and compactly. In addition, as the upper surface of the image sensor 300 is disposed parallel to the optical axis of the lens portion 100, the camera module 1000 may use a larger image sensor 300. Accordingly, the camera module 1000 may provide a high-pixel result.

The first driving member 500 may be connected to the first optical path control member 400. The first driving member 500 may include at least one actuator. The first driving member 500 may move the first light path control member 400 by using the driving force of the actuator. For example, the first driving member 500 may tilt and control the first optical path control member 400 in at least one of a second direction (x-axis direction) and a third direction (y-axis direction) as a rotational axis. Accordingly, the camera module 1000 can compensate for shaking due to rotation.

The second driving member 520 may be connected to the image sensor 300. The second driving member 520 may include at least one actuator. The second driving member 520 may control the position of the image sensor 300 by using the driving force of the actuator. For example, the second driving member 520 may move the image sensor 300 in at least one of a second direction (x-axis direction) and a third direction (y-axis direction). By the driving force of the second driving member 520, the image sensor 300 may correct a position change caused by shaking of the camera module 1000.

The sensing portion 700 may detect shaking of the camera module 1000. For example, the sensing portion 700 may include a first sensing portion 710 that detects a change in angular velocity and a second sensing portion 720 that detects a change in acceleration, and may detect rotation and positional changes that occur when shaking.

The camera module 1000 may include a control portion 750. The control portion 750 may control signals applied to the first driving member 500 and the second driving member 520, respectively, based on the angular velocity and acceleration change information detected by the sensing portion 700. For example, the first control portion of the control portion 750 may control the tilt angle of the first optical path control member 400 by controlling voltage, current, etc. applied to the first driving member 500. In addition, the second control portion 750 of the control portion 750 may control the position of the image sensor 300 by controlling voltage, current, etc. applied to the second driving member 520.

In detail, when shake occurs in the camera module 1000, the sensing portion 700 may detect information about the shake, and the control portion 750 may correct the shake. For example, when shaking occurs in the camera module 1000, the first sensing portion 710 may detect a change in angular velocity and the second sensing portion 720 may detect a change in acceleration. The sensing portion 700 may calculate and correct the degree of shaking of the camera module 1000, for example, the degree of rotation and the degree of positional change, based on the change detected by the first sensing portion 710 and the second sensing portion 720. The control portion 750 may correct a feedback value for the signal detected by the sensing portion 700. Here, the feedback value correction may be correction for controlling noise in the angular velocity and acceleration change information sensed by the sensing portion 700. In addition, the feedback value correction may mean correcting signals to be applied to the first driving member 500 and the second driving member 520 for controlling the first light path control member 400 and the image sensor 500 based on the acquired information. In detail, the first control portion may correct the degree of the rotation detected by the first sensing portion 710, and the second control portion may correct the degree of position change detected by the second sensing portion 720. Then, the first and second control portions may provide the corrected signals to the first driving member 500 and the second driving member 520, respectively.

Accordingly, the first optical path control member 400 is tilted in the first axis or the second axis according to the signal applied from the first control portion, and may correct shaking due to rotation. In detail, the first optical path control member 400 may tilt in the second direction (x-axis direction) and the third direction (y-axis direction) as a rotation axis, and the tilt angle of the first optical path control member 400 may satisfy Equation 4 below.

$$\frac{\phi x}{2} - 1 < \theta x < \frac{\phi x}{2} + 1 \qquad \text{[Equation 4]}$$

-continued $$\frac{\phi y}{2} - 1 < \theta y < \frac{\phi y}{2} + 1$$

In Equation 4, θx means an angle at which the first optical path control member 400 tilts in the second direction as an axis, and θy means an angle at which the first optical path control member 400 tilts in the third direction as an axis. In Equation 4, Φx means the amount of angle change of the camera module 1000 in the second direction obtained by the control portion 750, and Φy means the amount of the angle change of the camera module 1000 in the third direction obtained by the control portion 750.

In addition, the image sensor 300 may move in at least one of the second direction (x-axis direction) and the third direction (y-axis direction) by a signal applied from the second control portion 750 and may correct shaking according to the position change. In this case, the moving distance of the image sensor 300 may satisfy Equation 5 below.

$$\frac{Tx \times FL}{L} - 0.5 < Sx < \frac{Tx \times FL}{L} + 0.5 \qquad \text{[Equation 5]}$$

$$\frac{Ty \times FL}{L} - 0.5 < Sy < \frac{Ty \times FL}{L} + 0.5$$

In Equation 5, L means the distance to the subject, and FL means the total focal length of the lens portion 100. In Equation 5, Tx means the amount of position change of the camera module 1000 in the second direction obtained by the control portion 750, and Ty means the amount of the position change of the camera module 1000 in the third direction obtained by the control portion 750. In Equation 5, Sx means the distance that the image sensor 300 moves in the second direction (x-axis direction), and Sy means the distance that the image sensor 300 moves in the third direction (y-axis direction).

The camera module 1000 according to the embodiment may be set the tilt angle of the first light path control member 400 and the position of the image sensor 300 based on the amount of change in angular velocity and acceleration detected through the sensing portion 700. At this time, the control portion 750 may set the tilt angle of the first light path control member 400 through rotation by shaking, and set the moving distance of the image sensor 300 through a change in position by shaking. Accordingly, it is possible to effectively compensate for shaking due to rotation and positional change when photographing a subject located at infinity or a near distance using the camera module 1000 according to the embodiment.

Figure 7:
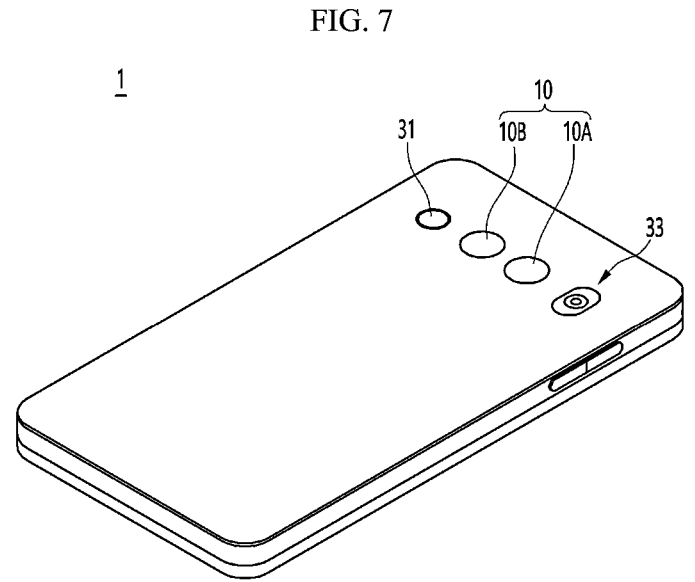
FIG. 7 is a diagram illustrating that a camera module according to an embodiment is applied to a mobile terminal.

FIG. 7 is a diagram illustrating that a camera module according to an embodiment is applied to a mobile terminal.

Referring to FIG. 7, the mobile terminal 1 may include a camera module 10 provided on the rear side thereof. The camera module 10 may include an image capturing function. In addition, the camera module 10 may include at least one of an auto focus function, a zoom function, and an OIS function. The camera module 10 may process a still image or video frame obtained by the image sensor 300 in a photographing mode or a video call mode. The processed image frame may be displayed on a display unit (not shown) of the mobile terminal 1 and may be stored in a memory (not shown). In addition, although not shown in the drawings, the camera module may be further disposed on the front side of the mobile terminal 1. For example, the camera module 10 may include a first camera module 10A and a second camera module 10B. At this time, at least one of the first camera module 10A and the second camera module 10B may include the camera module 1000 described above. Accordingly, the camera module 10 may provide an OIS function for a subject located at infinity or at a near distance. In detail, the camera module 10 may provide an anti-shake function based on the angular velocity and acceleration that change when the camera module 10 shakes. Accordingly, the camera module 10 may effectively inhibit shaking when photographing subjects located at various distances. In addition, since the camera module 10 may have a slimmer structure, the mobile terminal 1 may also be provided with a slimmer structure.

The mobile terminal 1 may further include an autofocus device 31. The auto focus device 31 may include an auto focus function using a laser. The autofocus device 31 may be mainly used in a condition in which an auto-focus function using an image of the camera module 10 is degraded, for example, a proximity of 10 m or less or a dark environment. The autofocus device 31 may include a light emitting unit including a vertical cavity surface emitting laser (VCSEL) semiconductor device and a light receiving unit such as a photodiode that converts light energy into electrical energy. The mobile terminal 1 may further include a flash module 33. The flash module 33 may include a light emitting element emitting light therein. The flash module 33 may be operated by a camera operation of a mobile terminal or a user's control.

Features, structures, effects, etc. described in the embodiments above are included in at least one embodiment of the invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the invention. In addition, although the above has been described with a focus on the embodiments, these are only examples and do not limit the invention, and those skilled in the art to which the invention belongs can exemplify the above to the extent that does not deviate from the essential characteristics of the present embodiment. It will be seen that various variations and applications that have not been made are possible. For example, each component specifically shown in the embodiment can be modified and implemented. And differences related to these modifications and applications should be construed as being included in the scope of the invention as defined in the appended claims.

The invention claimed is:

1. A camera module comprising:
    a first optical path control member disposed on a moving path of light reflected from a subject and configured to reflect light, which is incident in a first direction, in a second direction perpendicular to the first direction;
    a first driving member connected to the first light path control member and configured to control movement of the first light path control member;
    a lens portion disposed on the moving path of the light and including at least one lens;
    an image sensor configured to detect light passing through the lens portion;
    a sensing portion configured to detect angular velocity and acceleration that change due to shaking; and a control portion configured to control the tilt of the first optical path control member in a first axis or a second axis based on the angular velocity and acceleration changed by the shaking, wherein the first optical path control member is provided to be tiltable with a rotation axis in the second direction and in a third direction perpendicular to the first and second directions, wherein a tilt angle of the first optical path control member satisfies the following Equation 1:

$$\frac{\phi x}{2} - \frac{\tan^{-1}\left(\frac{Ty}{L}\right)}{2} - 1 < \theta x < \frac{\phi x}{2} - \frac{\tan^{-1}\left(\frac{Ty}{L}\right)}{2} + 1 \qquad \text{[Equation 1]}$$

$$\frac{\phi y}{2} - \frac{\tan^{-1}\left(\frac{Tx}{L}\right)}{2} - 1 < \theta y < \frac{\phi y}{2} - \frac{\tan^{-1}\left(\frac{Tx}{L}\right)}{2} + 1$$

where L is a distance to the subject, $\theta x$ is an angle at which the first optical path control member tilts in the second direction as an axis, $\theta y$ is an angle at which the first optical path control member tilts in the third direction as an axis, $\Phi x$ is an amount of angle change of the camera module with respect to the second direction obtained by the control portion, $\Phi y$ is an amount of angle change of the camera module with respect to the third direction obtained by the control portion, Tx is an amount of change in a position of the camera module in the second direction obtained by the control portion, and Ty is an amount of change in the position of the camera module in the third direction obtained by the control portion.

2. The camera module of claim 1, wherein an optical axis of the lens portion is perpendicular to an upper surface of the image sensor.

3. The camera module of claim 1, wherein the sensing portion includes a first sensing portion configured to detect a change in angular velocity of the camera module and a second sensing portion configured to detect a change in acceleration of the camera module.

4. A camera module comprising:

a first optical path control member disposed on a moving path of light reflected from a subject and configured to reflect light, which is incident in a first direction, in a second direction perpendicular to the first direction;

a first driving member connected to the first light path control member and configured to control movement of the first light path control member;

a lens portion disposed on the moving path of the light and including at least one lens;

an image sensor configured to detect light passing through the lens portion;

a sensing portion configured to detect angular velocity and acceleration that change due to shaking;

a second driving member connected to the image sensor and configured to control a position of the image sensor; and a control portion -configured to control a tilt angle of the first optical path control member and a position of the image sensor based on the angular velocity and acceleration changed by the shaking, wherein the first optical path control member is provided to be tiltable with a rotation axis in each of the second direction and in a third direction perpendicular to the first and second directions, wherein a tilt angle of the first optical path control member satisfies the following Equation 2:

$$\frac{\phi x}{2} - 1 < \theta x < \frac{\phi x}{2} + 1 \qquad \text{[Equation 2]}$$

$$\frac{\phi y}{2} - 1 < \theta y < \frac{\phi y}{2} + 1$$

where $\theta x$ is an angle at which the first optical path control member tilts in the second direction, $\theta y$ is an angle at which the first optical path control member tilts in the third direction, $\Phi x$ is an amount of angle change of the camera module with respect to the second direction obtained by the control portion, and $\Phi y$ is an amount of angle change of the camera module with respect to the third direction obtained by the control portion.

5. The camera module of claim 4, wherein a moving distance of the image sensor satisfies the following Equation 3:

$$\frac{Tx \times FL}{L} - 0.5 < Sz < \frac{Tx \times FL}{L} + 0.5 \qquad \text{[Equation 3]}$$

$$\frac{Ty \times FL}{L} - 0.5 < Sy < \frac{Ty \times FL}{L} + 0.5$$

where L is a distance to the subject, FL is a total focal length of the lens portion, Tx -is an amount of change in a position of the camera module in the second direction obtained by the control portion, Ty is an amount of change in the position of the camera module in the third direction obtained by the control portion, Sz is a distance that the image sensor moves in the first direction, and Sy is a distance that the image sensor moves in the third direction.

6. The camera module of claim 5, wherein a height of the second driving member in the first direction is lower than a height of the first light path control member in the first direction.

7. The camera module of claim 5, wherein an optical axis of the lens portion is perpendicular to an upper surface of the image sensor.

8. The camera module of claim 4, comprising a second optical path control member disposed between the lens portion and the image sensor, wherein the second optical path control member is configured to reflect light, which is incident in the second direction, to the first direction.

9. The camera module of claim 8, wherein a moving distance of the image sensor satisfies the following Equation 4:

$$\frac{Tx \times FL}{L} - 0.5 < Sx < \frac{Tx \times FL}{L} + 0.5 \qquad \text{[Equation 4]}$$

$$\frac{Ty \times FL}{L} - 0.5 < Sy < \frac{Ty \times FL}{L} + 0.5$$

where L is a distance to the subject, FL is a total focal length of the lens portion, Tx is an amount of change in a position of the camera module with respect to the second direction obtained by the control portion, Ty is an amount of change in the position of the camera module in the third direction obtained by the control portion, Sx is a distance that the image sensor moves in the second direction, and Sy is a distance that the image sensor moves in the third direction.

10. The camera module of claim 9, wherein a height of the second optical path control member in the first direction is lower than a height of the first optical path control member in the first direction.

11. The camera module of claim 9, wherein an optical axis of the lens portion is parallel to an upper surface of the image sensor.

12. The camera module of claim 4, wherein the first optical path control member includes a right-angle prism.

13. The camera module of claim 4, wherein when photographing the subject while the subject is located at an infinite or near distance, the first optical path control member corrects shaking caused by rotation of the camera module and shaking caused by position change.

14. The camera module of claim 4, wherein the lens portion includes a plurality of lenses.

15. The camera module of claim 4, wherein an effective focal length of the lens portion is variable.

16. The camera module of claim 4, wherein the sensing portion is configured to detect rotation and position changes applied to the camera module.

17. The camera module of claim 9, wherein the sensing portion includes a first sensing portion configured to detect a change in angular velocity of the camera module, and a second sensing portion configured to detect a change in acceleration of the camera module.

18. The camera module of claim 17, wherein the first sensing portion includes a gyro sensor, and the second sensing portion includes an acceleration sensor.

19. The camera module of claim 1, wherein the first optical path control member includes a right-angle prism.

20. The camera module of claim 1, wherein when photographing the subject while the subject is located at an infinite or near distance, the first optical path control member corrects shaking caused by rotation of the camera module and shaking caused by position change.

* * * * *